United States Patent
Hein et al.

(10) Patent No.: US 7,159,402 B2
(45) Date of Patent: Jan. 9, 2007

(54) VORTEX REDUCER IN THE HIGH-PRESSURE COMPRESSOR OF A GAS TURBINE

(75) Inventors: Stefan Hein, Berlin (DE); Manuela Stein, Berlin (DE); Dieter Peitsch, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 126 days.

(21) Appl. No.: 10/309,233

(22) Filed: Dec. 4, 2002

(65) Prior Publication Data

US 2003/0101730 A1   Jun. 5, 2003

(30) Foreign Application Priority Data

Dec. 5, 2001   (DE)   ............................ 101 59 670

(51) Int. Cl.
  *F02C 6/04*   (2006.01)
(52) U.S. Cl. ................... 60/785; 415/115; 415/116
(58) Field of Classification Search ............... 60/785, 60/806, 39.83; 415/115, 116; 416/96 R, 416/97 R, 95
  See application file for complete search history.

(56) References Cited

U.S. PATENT DOCUMENTS

| 2,618,433 | A |   | 11/1952 | Loos et al. | |
|---|---|---|---|---|---|
| 2,810,544 | A | * | 10/1957 | Schorner | 416/96 R |
| 3,043,561 | A | * | 7/1962 | Scheper, Jr. | 415/115 |
| 3,632,221 | A | * | 1/1972 | Uehling | 415/115 |
| 3,742,706 | A | * | 7/1973 | Klompas | 60/726 |
| 3,982,852 | A | * | 9/1976 | Andersen et al. | 416/95 |
| 4,102,603 | A | * | 7/1978 | Smith et al. | 416/244 A |
| 4,415,310 | A | * | 11/1983 | Bouiller et al. | 416/95 |
| 4,595,339 | A | * | 6/1986 | Naudet | 416/95 |
| 4,787,820 | A | * | 11/1988 | Stenneler et al. | 416/95 |
| 5,135,354 | A | * | 8/1992 | Novotny | 415/115 |
| 5,226,785 | A | * | 7/1993 | Narayana et al. | 415/115 |
| 5,472,313 | A |   | 12/1995 | Quinones et al. | |
| 5,482,431 | A | * | 1/1996 | Taylor | 415/111 |
| 5,700,130 | A | * | 12/1997 | Barbot et al. | 416/95 |
| 6,648,592 | B1 | * | 11/2003 | Escure et al. | 415/115 |

FOREIGN PATENT DOCUMENTS

| DE | 2633222 | 1/1978 |
|---|---|---|
| DE | 3031553 | 3/1981 |
| DE | 19852604 | 5/2000 |
| DE | 19854907 | 5/2000 |
| DE | 19961565 | 6/2001 |
| FR | 2614654 | 11/1988 |
| FR | 01 07121 | * 4/2002 |
| GB | 1541533 | 3/1979 |
| GB | 2057573 | 4/1981 |

* cited by examiner

*Primary Examiner*—William H. Rodriguez
(74) *Attorney, Agent, or Firm*—Timothy J. Klima

(57) ABSTRACT

A tube-type vortex reducer for the conduction of cooling air in a compressor 1 of a gas turbine with at least one radial secondary air tube 2 arranged in a disk interspace 3, includes a deflector arranged in a discharge area of the secondary air tube for the deflection of the secondary air flow into an axial direction or away from an axial direction.

12 Claims, 3 Drawing Sheets

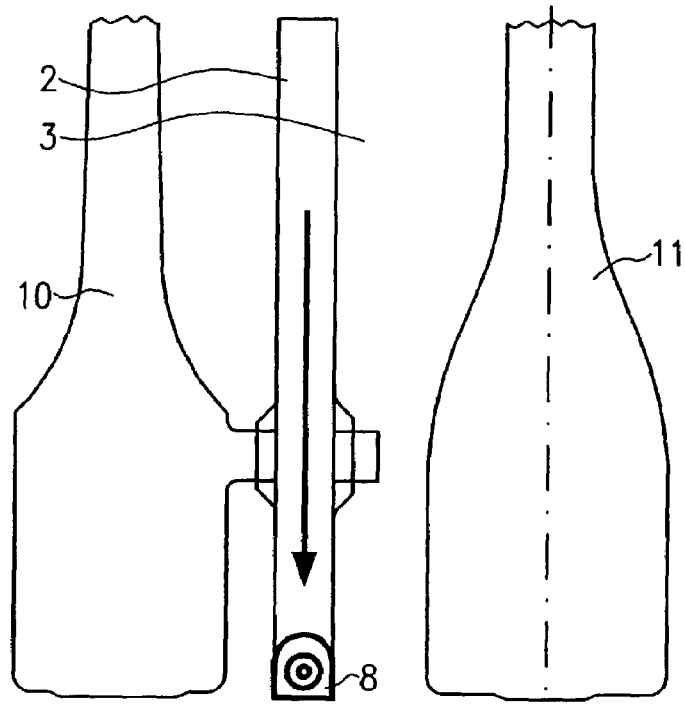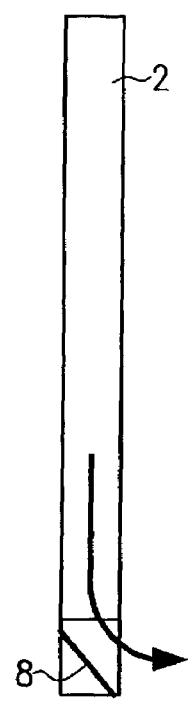
Fig.6  Fig.7
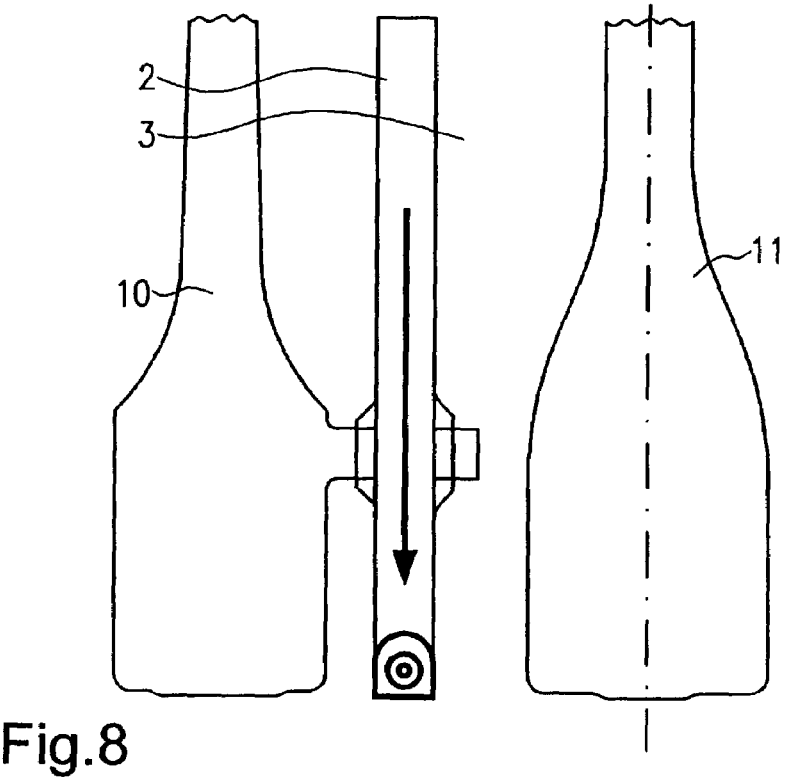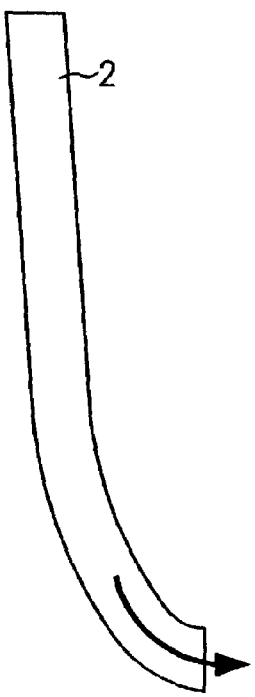
Fig.8  Fig.9

VORTEX REDUCER IN THE HIGH-PRESSURE COMPRESSOR OF A GAS TURBINE

This application claims priority to German Patent Application DE10159670.7 filed Dec. 5, 2001, the entirety of which is incorporated by reference herein.

BACKGROUND OF THE INVENTION

This invention relates to a tube-type vortex reducer for a high-pressure compressor of a gas turbine.

More particularly, this invention relates to a vortex reducer in which secondary air tubes are arranged in a disk interspace.

The use of secondary air tubes for the conduction of the secondary air flow in a disk interspace is known from the prior art. Such designs are described in general terms in Specifications DE 26 33 222 A1 or U.S. Pat. No. 3,043,561, for example.

These designs are disadvantageous in that the vortex formation at the exit of the secondary air tubes entails pressure losses and dissipation.

BRIEF SUMMARY OF THE INVENTION

In a broad aspect, the present invention provides a vortex reducer of the type described above which avoids the disadvantages of the state of the art, while ensuring effective conduction of the secondary air and being of straightforward design and simple and reliable function.

It is a particular object of the present invention to provide a solution to the above problem by the vortex reducer described herein, with further objects and advantages of the present invention being described below.

The present invention accordingly provides for the arrangement of means of deflection in the discharge area of the secondary air tubes in order to conduct the secondary air flow into the axial direction.

The vortex reducer according to the present invention is characterized by a variety of considerable advantages.

It is known that the radial air discharge at very high rotational speed of the compressor and the subsequent deflection of the secondary air in the axial direction involve high pressure losses. In order to reduce this pressure loss and minimize pressure decay, said vortex reducers are used. In their simplest form, these vortex reducers are provided as straight, radially inward tube systems (secondary air tubes) in which the secondary air is positively guided. It is an advantageous aspect of these systems that the circumferential speed of the secondary air increases slightly as it passes inwards radially through the disk interspace to the shaft center. Thus, the resulting pressure decay is smaller than in a system without vortex reduction.

In order to reduce the pressure loss even further, the present invention provides for the arrangement of deflection means in the discharge area of the secondary air tubes to orientate the secondary airflow into the axial direction. This arrangement enables the exit vortex of the secondary air tube to be reduced.

In a particularly favorable form, the deflection means comprise an essentially conical deflector ring installed on the compressor shaft. This solution is technically easily realizable and ensures that the airflow is safely deflected even at high rotational speed.

The effective deflection surface of the deflector ring is preferably arranged at 45° to the center plane of the rotational axis of the compressor shaft. The deflection surface, therefore, shows in the direction of the axial airflow to be obtained, this exerting positive influences on the flow characteristics.

The deflector ring can simply be installed between the adjacent rotor disks, or compressor disks, forming the disk interspace, for example between the stage 6 rotor disk and the stage 7 rotor disk.

The deflection surface of the deflector ring can accordingly be oriented essentially at 45° to the radial center plane of the secondary air tube.

In an alternative embodiment of the invention, the deflection means comprise a deflector plate arranged on any of the secondary air tubes. This deflector plate is preferably provided in the area of discharge on the secondary air tube. Preferably, the deflector plate is essentially planar. It can be oriented at 45° to the radial center plane of the secondary air tube.

In a preferred development of the design described above, the deflector plate can also be rotated by 90° to orientate the airflow against the direction of rotation of the compressor shaft.

In a further embodiment, the deflection means according to the present invention are provided as a curved outlet tube which is one-part with the secondary air tube. The outlet tube may, for example, be angled or bent at 90° to the centerline of the secondary air tube. In this arrangement, it can also be advantageous to orient the exit of the outlet tube against the direction of rotation of the compressor shaft. Such deflection will further cool down the secondary air.

It is apparent that, according to the present invention, the arrangement of the effective surfaces of the deflection means is not intended to be limited to the 45° position described. Rather, alteration of the effective discharge angle is likely to bring about a combination of the various advantageous effects of the present invention, thus providing potential for a plurality of modifications or variations.

Also, the effective deflection surfaces are not intended to be limited to the plane or truncated-cone shape. Giving these surfaces a three-dimensional or curved shape, similar to the curvature of the outlet tube, will deflect the secondary air more smoothly, thus providing for further reduction of the deflection pressure loss.

BRIEF DESCRIPTION OF THE DRAWINGS

This invention is more fully described in the light of the accompanying drawing showing a preferred embodiment. In the drawings:

FIG. 6 is a further embodiment analogically to the embodiment shown in FIG. 4, FIG. 7 is a side view of the secondary air tube shown in FIG. 6, FIG. 8 is a view, similar to FIGS. 4 and 6, of a further embodiment, and FIG. 9 is a view of the secondary air tube of the embodiment in FIG. 8 rotated by 90°.

DETAILED DESCRIPTION OF THE INVENTION

Figure 1:
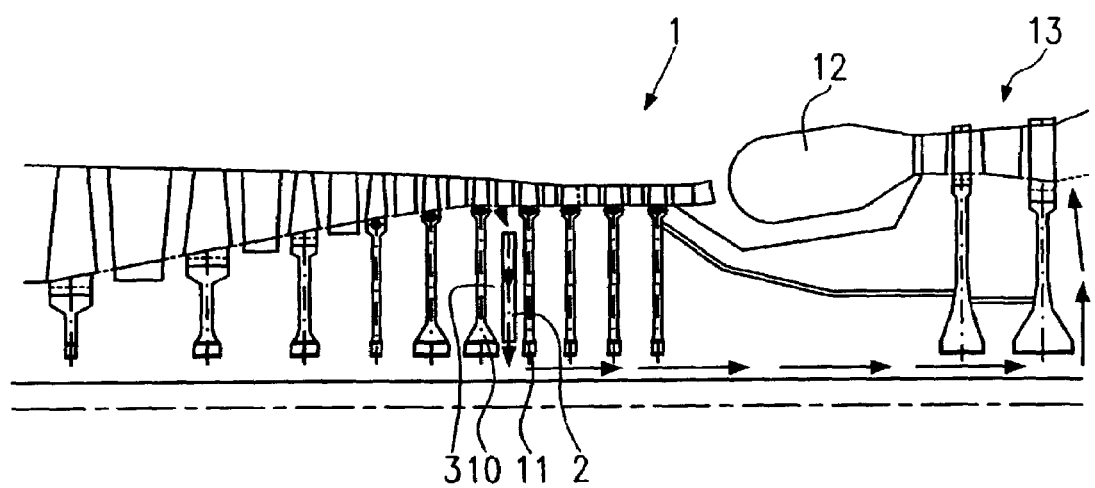
FIG. 1 is a schematic partial side view of a gas turbine according to the present invention.

FIG. 1 shows, in schematic representation, a partial area of a gas turbine. Reference numeral 1 indicates a compressor which comprises several compressor disks or rotor disks. Reference numeral 10 indicates a compressor disk of stage 6, while reference numeral 11 indicates a compressor disk of stage 7, for example. These disks form a disk interspace 3 in which a plurality of radially arranged secondary air tubes 2 (see also FIG. 3) are provided. The arrangement and design of the secondary air tubes 2 is known from the prior art, so that a detailed description is dispensed with herein. FIG. 1 further shows, in schematic representation, a combustion chamber 12 and, also in schematic representation, a turbine 13. FIG. 1 also illustrates the cooling airflows in highly simplified manner. As these flows are also known from the prior art, a further description is again dispensed with herein.

Figure 2:
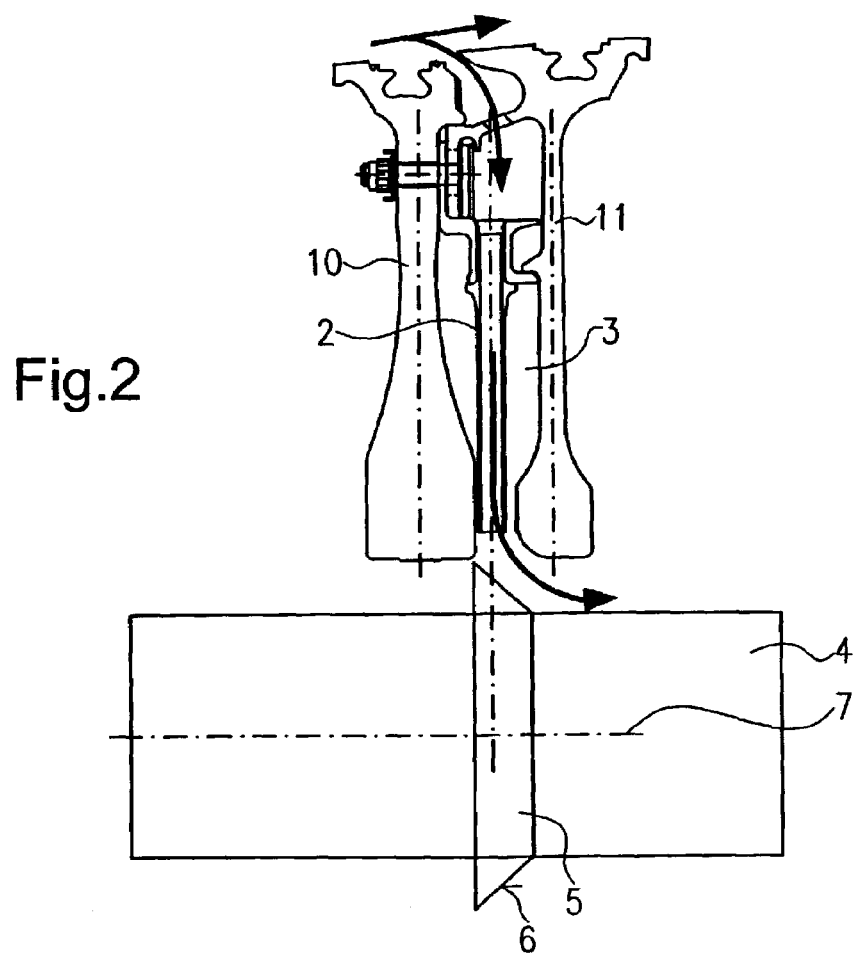
FIG. 2 is an enlarged partial sectional view of a first embodiment of the vortex reducer according to the present invention.

FIG. 2 shows a first embodiment of the present invention. A deflector ring 5 is here fitted to a compressor shaft 4 in the discharge area of the secondary air tube 2, with the essentially truncated-cone shape of the deflector ring 5 providing a deflection surface 6 which is orientated at an angle, preferably essentially at 45°, to the radial rotational plane or a center axis through the rotational axis 7, respectively. Accordingly, the airflow is deflected as it issues from the secondary air tubes, as indicated by the arrowhead.

Figure 3:
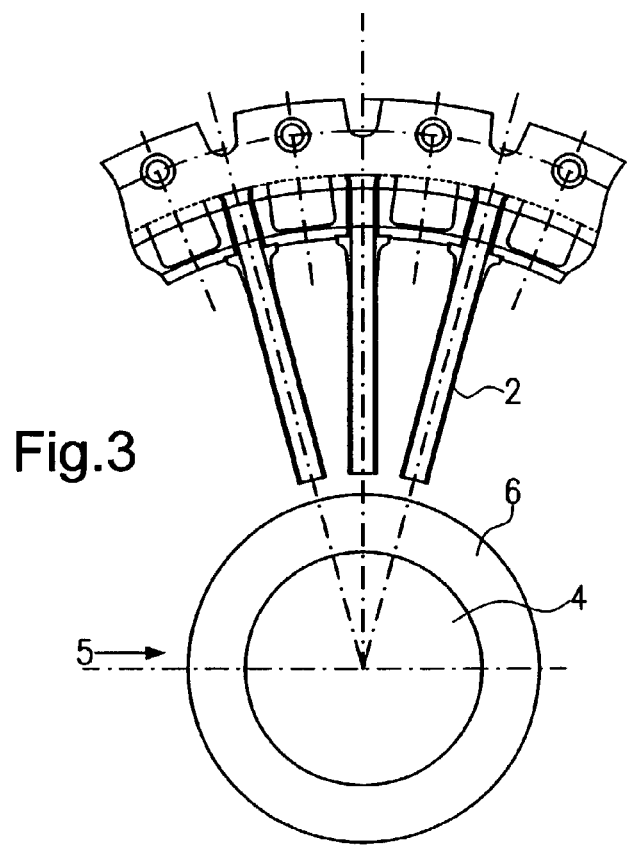
FIG. 3 is a front view of the arrangement shown in FIG. 2.

FIG. 3 shows a front view of the arrangement according to FIG. 2.

Figure 4:
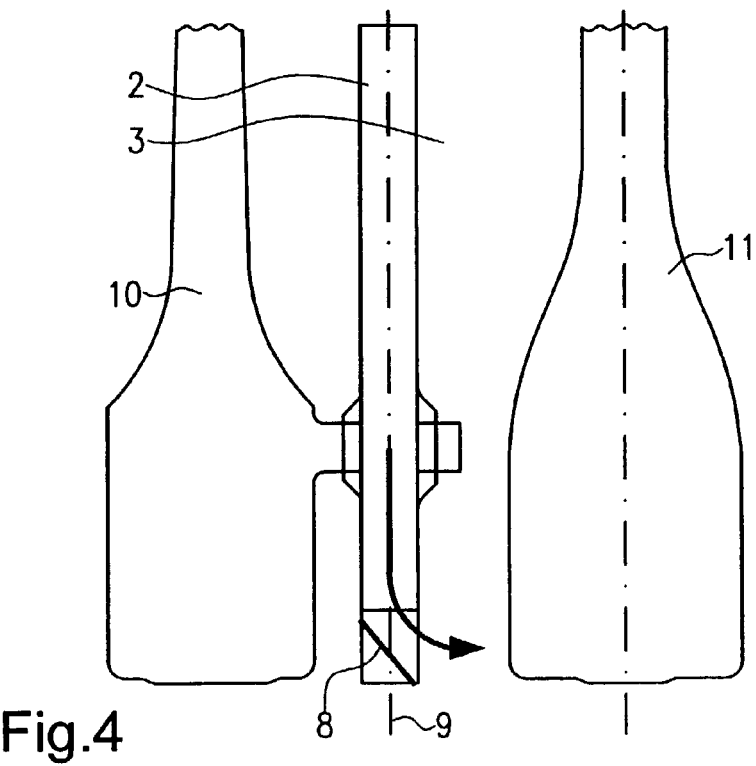
FIG. 4 is a modified embodiment using a deflector plate.
Figure 5:
FIG. 5 is a side view of the secondary air tube shown in FIG. 4.

FIGS. 4 and 5 illustrate a further variant in which an essentially planar deflector plate 8 is provided in the discharge area of each of the secondary air tubes 2, the surface of this deflector plate 8 being oriented at an angle, preferably about 45°, to the center plane 9 of the secondary air tube 2, as related to a radial center plane.

FIG. 5 shows a view, rotated 90°, of the discharge area of the secondary air tube according to FIG. 4.

FIGS. 6 and 7 illustrate a further variant in which the deflector plate 8 is oriented such that the exiting airflow is directed against the direction of rotation of the compressor shaft 4. That is, the air flow exits to the right in the figure with the shaft rotation being counterclockwise so that the surface of the shaft adjacent the air tube 2 is moving to the left. FIG. 7 shows a side view, rotated by 90°, of the secondary air tube in accordance with FIG. 6.

FIGS. 8 and 9 show a further embodiment in which the lower portion of the secondary air tube is curved or angled, as a result of which the tube outlet is angled, preferably at about 90° to the plane of the tube inlet.

It is intended that the various angles discussed above can be altered as necessary to achieve the desired air flows.

It is apparent that a plurality of modifications may be made to the embodiments here shown without departing from the inventive concept and that various aspects of the different embodiments can be combined to create additional embodiments of the present invention.

What is claimed is:

1. A tube-type vortex reducer for the conduction of cooling air in a compressor of a gas turbine with at least one radial secondary air tube arranged in a compressor disk interspace for conducting cooling air radially inwardly, comprising:

a deflector positioned in a discharge area of the secondary air tube for the deflection of the secondary air flow into an axial direction, wherein the deflector comprises an essentially conical deflector ring installed on a compressor shaft.

2. A tube-type vortex reducer in accordance with claim 1, wherein an effective deflection surface of the deflector ring is orientated at essentially 45° to a center plane of a rotational axis of the compressor shaft.

3. A tube-type vortex reducer in accordance with claim 2, wherein the effective deflection surface of the deflector ring is orientated at essentially 45° to a radial center plane of the secondary air tube.

4. A tube-type vortex reducer for the conduction of cooling air in a compressor of a gas turbine with at least one radial secondary air tube arranged in a compressor disk interspace for conducting cooling air radially inwardly, comprising:

a deflector positioned in a discharge area of the secondary air tube for the deflection of the secondary air flow into an axial direction wherein the deflector comprises a deflector plate attached to the secondary air tube and the deflector plate is essentially planar and oriented at essentially 45° to a radial center plane of the secondary air tube.

5. A tube-type vortex reducer for the conduction of cooling air in a compressor of a gas turbine with at least one radial secondary air tube arranged in a compressor disk interspace for conducting cooling air radially inwardly, comprising a deflector positioned in a discharge area of the secondary air tube for the deflection of substantially all of the secondary air flow in a generally same direction away from an axial direction.

6. A tube-type vortex reducer in accordance with claim 5, wherein the deflector comprises a deflector plate attached to the secondary air tube.

7. A tube-type vortex reducer in accordance with claim 6, wherein the deflector plate is essentially orientated at 45° to a radial center plane of the secondary air tube and is rotated away from an axial direction by about 90°.

8. A tube-type vortex reducer in accordance with claim 5, wherein the deflector comprises a secondary air tube outlet portion oriented at an angle to a center plane of the secondary air tube.

9. A tube-type vortex reducer in accordance with claim 8, wherein the secondary air tube outlet portion is oriented at about 90° to the center plane of the secondary air tube.

10. A tube-type vortex reducer in accordance with claim 9, wherein a discharge flow of the secondary air tube is opposite to the direction of rotation of the compressor shaft.

11. A tube-type vortex reducer in accordance with claim 8, wherein a discharge flow of the secondary air tube is opposite to the direction of rotation of the compressor shaft.

12. A tube-type vortex reducer in accordance with claim 5, wherein a discharge flow of the secondary air tube is opposite to the direction of rotation of the compressor shaft.

* * * * *